United States Patent
Chen et al.

(10) Patent No.: US 7,756,083 B2
(45) Date of Patent: Jul. 13, 2010

(54) NETWORK ACCESS DEVICE, NETWORK CONNECTION ESTABLISHING METHOD, AND MOBILE COMMUNICATION SYSTEM USING THE SAME

(75) Inventors: Chih-Lung Chen, Taipei-Hsien (TW); Chih-Wei Tung, Taipei-Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 838 days.

(21) Appl. No.: 11/615,947

(22) Filed: Dec. 23, 2006

(65) Prior Publication Data
US 2008/0101299 A1 May 1, 2008

(30) Foreign Application Priority Data
Oct. 27, 2006 (TW) .............................. 95139849 A

(51) Int. Cl.
*H04W 4/00* (2009.01)
(52) U.S. Cl. .................. 370/332; 370/230; 370/401
(58) Field of Classification Search ............... 370/332, 370/230, 338; 713/171, 150, 158
See application file for complete search history.

(56) References Cited

U.S. PATENT DOCUMENTS

| | | | |
|---|---|---|---|
| 6,307,837 B1 * | 10/2001 | Ichikawa et al. ............ 370/230 |
| 7,174,456 B1 * | 2/2007 | Henry et al. ................. 713/158 |
| 7,450,544 B2 * | 11/2008 | Rue ............................ 370/331 |
| 2002/0176427 A1 * | 11/2002 | Noda et al. ................... 370/401 |
| 2003/0185172 A1 * | 10/2003 | Rue ............................ 370/331 |
| 2006/0130126 A1 * | 6/2006 | Touve et al. ................. 726/5 |

FOREIGN PATENT DOCUMENTS

CN 03113473.4 1/2005

* cited by examiner

*Primary Examiner*—David Q Nguyen
(74) *Attorney, Agent, or Firm*—Wei Te Chung

(57) ABSTRACT

A network access device (10) for using in a mobile communication system includes a receiving module (100), a parsing module (110), a determining module (120), a storage module (130), and a sending module (140). The receiving module receives a packet, and the packet includes a source address and a destination address. The parsing module connected to the receiving module parses the packet to retrieve the source address and the destination address of the packet. The determining module connected to the parsing module determines whether a source of the packet has been authenticated. The storage module connected to the determining module saves notification messages indicating that the source of the packet has been authenticated. The sending module sends the packet to a destination corresponding to the destination address of the packet when the source of the packet has been authenticated.

18 Claims, 4 Drawing Sheets

NETWORK ACCESS DEVICE, NETWORK CONNECTION ESTABLISHING METHOD, AND MOBILE COMMUNICATION SYSTEM USING THE SAME

BACKGROUND OF THE INVENTION

1. Field of the Invention

The invention relates to mobile communication devices, and particularly to a network access device, network connection establishing method, and a mobile communication system using the same.

2. Description of Related Art

Electronic communication networks have become more and more popular due to developments in communication technology. Some public places, such as sports arenas, shopping centers, are equipped with networks for users of mobile terminals. If a user of a mobile terminal wants to connect to a network wirelessly, the mobile terminal must first establish connection with and authenticate itself to an access point for connecting to the network, and then the mobile terminal can wirelessly communicate with the network via the access point. The authentication data of the mobile terminal is saved in the access point.

If the mobile terminal roams away from the coverage area of the access point, then the mobile terminal must establish a new connection with and authenticate itself to the next access point to continue communication with the network. This is inconvenient and puzzling for the user of the mobile terminal, and also increases operation loading of the network. A typically conventional method uses establishment of authentication connection between two different access points when the mobile terminal roams from one of the two access points to the other of the two access points. However, the mobile terminal still needs to experience the authentication process from each of the two access points. Therefore, it is nevertheless very inconvenient for the user of the mobile terminal.

SUMMARY OF THE INVENTION

In one aspect of the invention, a network access device for use in a mobile communication system is provided. The network access device includes a receiving module, a parsing module, a determining module, a storage module, and a sending module. The receiving module receives a packet, and the packet includes a source address and a destination address. The parsing module connected to the receiving module parses the packet to retrieve the source address and the destination address of the packet. The determining module connected to the parsing module determines whether a source of the packet is authentic. The storage module connected to the determining module saves notification messages indicating that the source of the packet is authentic. The sending module sends the packet to a destination corresponding to the destination address of the packet when the source of the packet is authentic.

In another aspect of the invention, a mobile communication system for connecting a mobile terminal to a network is provided. The mobile communication system includes the mobile terminal, a plurality of network access devices connected to the network, and an authentication server. The plurality of network access devices determines whether the mobile terminal communicating therewith is authentic. The authentication server connected to the plurality of network access devices authenticates the mobile terminal via one of the plurality of network access devices, and sends a first notification message to the one of the plurality of the network access devices and a second notification message to others of the plurality of network access devices after authentication is finished. After the mobile terminal is authenticated with the authentication server, the mobile terminal can communicate with the network via each of the plurality of network access devices.

In a further aspect of the invention, a network connection establishing method for use in a mobile communication system is provided. The mobile communication system includes a mobile terminal, a plurality of network access devices, and an authentication server, and the plurality of network access devices saves notification messages sent by the authentication server. The network connection establishing method includes receiving and parsing a packet to retrieve a source address of the packet by one of the plurality of network access devices; determining whether a source of the packet has been authenticated; determining whether the packet is from the authentication server if the source of the packet has not been authenticated; establishing a connection between the source of the packet and the authentication server, for authentication of the source by the authentication server if the packet is not from the authentication server; sending a first notification message to the one of the plurality of network access devices and a second notification message to others of the plurality of network access devices after authentication is finished; communicating with the network via the one of the plurality of network access devices; roaming to a coverage area of another of the plurality of the network access devices; determining whether the mobile terminal has been authenticated; and establishing a connection between the mobile terminal and the network if the mobile terminal has been authenticated.

Other advantages and novel features will become more apparent from the following detailed description when taken in conjunction with the accompanying drawings.

DETAILED DESCRIPTION OF THE INVENTION

Figure 1:
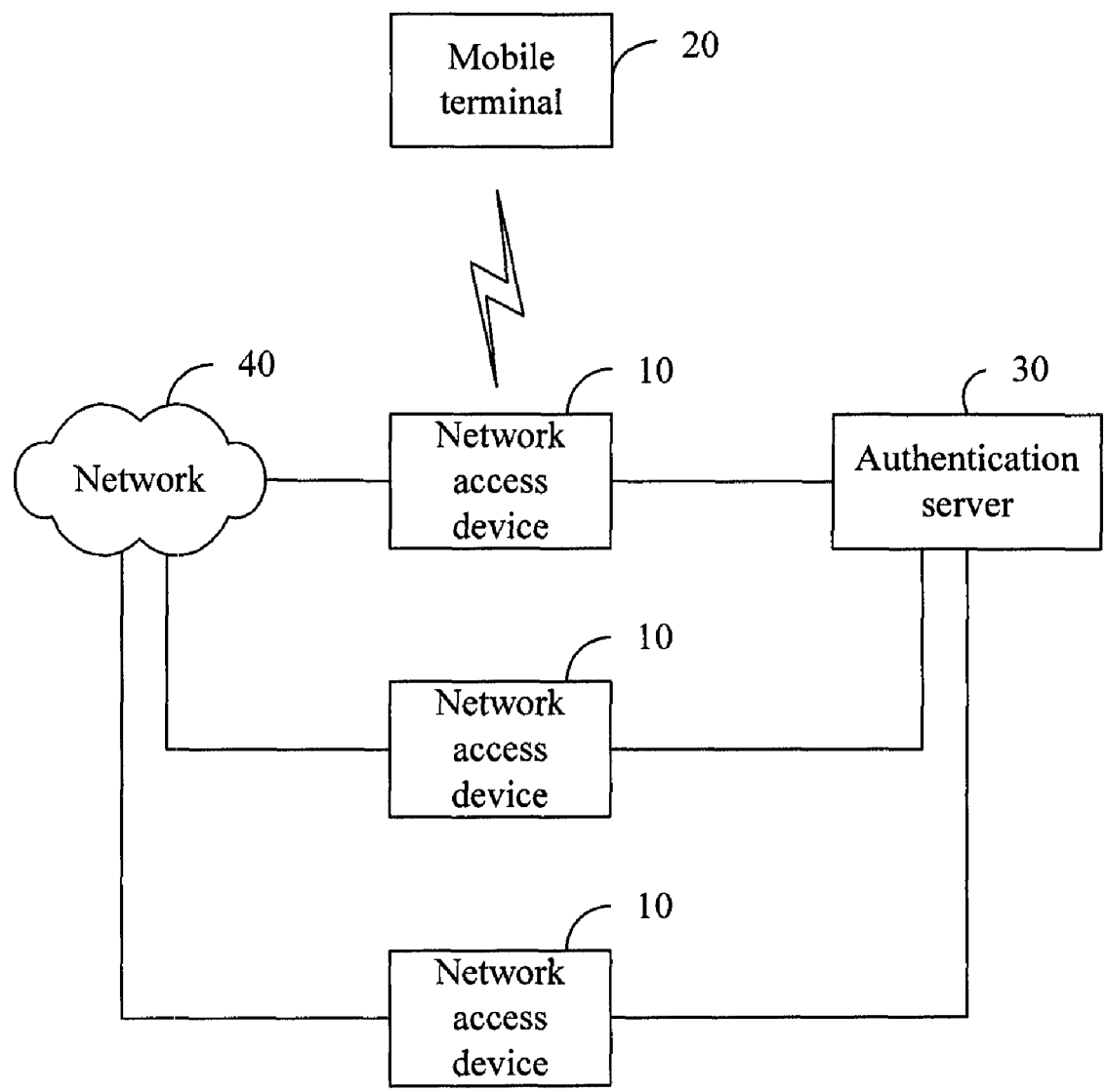
FIG. 1 is a schematic diagram of a mobile communication system of an exemplary embodiment of the invention.

FIG. 1 is a schematic diagram of a mobile communication system of an exemplary embodiment of the invention. In the exemplary embodiment, the mobile communication system includes a plurality of network access devices 10 (only three shown in FIG. 1), a mobile terminal 20, and an authentication server 30 connected to the plurality of network access devices 10. The network access devices 10 are also connected to a network 40 for establishing communication between the mobile terminal 20 and the network 40. In the exemplary embodiment, the network access devices may be access points or modems, and the mobile communication system may include a plurality of mobile terminals 20.

The authentication server 30 is used for authenticating the mobile terminal 20 via one of the network access device 10 and sending a first notification message to the one of the network access devices 10 communicating with the mobile terminal 20 and a second notification message to others of the network access devices 10 after successful authentication. In the exemplary embodiment, the first notification message includes an address of the one of the network access devices 10 communicating with the mobile terminal 20, and the second notification message includes a media access control (MAC) address of the mobile terminal 20. In alternative embodiments, the first notification message is the same as the second notification message, both including the MAC address of the mobile terminal 20.

In an alternative embodiment of the invention, the first notification message and the second notification message both include an idle timeout period and an aging timeout period. If an idle period of the authenticated mobile terminal 20 exceeds the idle timeout period, the mobile terminal 20 must be re-authenticated by the authentication server 30 before communicating with the network 40. If a usage period of the authenticated mobile terminal 20 exceeds the aging timeout period, the mobile terminal 20 must be re-authenticated by authentication server 30 to continuously communicate with the network 40. In the exemplary embodiment, the first notification message and the second notification message are transmitted via hypertext transfer protocol (HTTP) packets.

A manager of the mobile communication system sets data of network access devices 10 of the mobile communication system in the authentication server 30, for example, inputting Internet protocol addresses of all network access devices 10 in the mobile communication system to the authentication server 30. After authenticating the mobile terminal 20, the authentication server 30 sends the first notification message and/or the second notification message to the set network access devices 10.

When the mobile terminal 20 first enters the mobile communication system, the mobile terminal 20 must be authenticated by the authentication server 30 via one of the network access devices 10 to wirelessly communicate with the network 40. After the authentication server 30 successfully authenticates the mobile terminal 20, the authentication server 30 sends a first notification message to the one of the network access devices 10, and sends a second notification message to others of the network access devices 10. Then, the mobile terminal 20 can communicate with the network 40 via the one of the network access devices 10. If the mobile terminal 20 roams, and needs to communicate with the network 40 via another network access device 10 of the mobile communication system, because the another network access device 10 has already received the second notification message including the MAC address of the mobile terminal 20, the another network access device 10 determines that the mobile terminal 20 has been authenticated, and directly sets communication between the mobile terminal 20 and the authentication server 30. That is, after successfully authenticating with the authentication server 30, the mobile terminal 20 can communicate with the network 40 via each of the network access devices 10.

Figure 2:
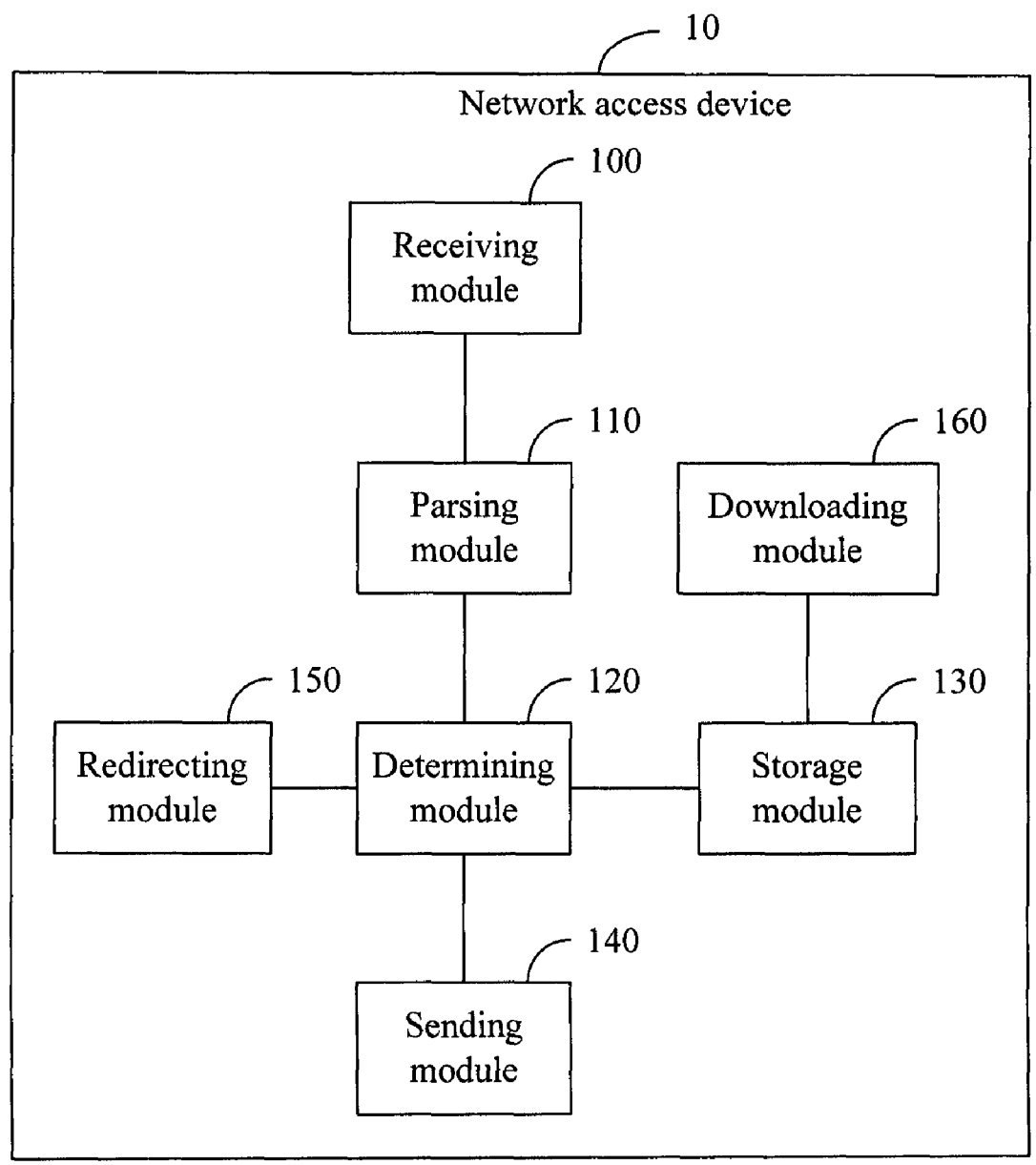
FIG. 2 is a schematic diagram of a network access device of another exemplary embodiment of the invention.

FIG. 2 is a schematic diagram of the network access devices 10. In the exemplary embodiment, each of the network access devices 10 includes a receiving module 100, a parsing module 110, a determining module 120, a storage module 130, and a sending module 140. The storage module 130 is used for saving notification messages of sources of packets, that is, notification messages sent by the authentication server 30.

The receiving module 100 is used for receiving a packet including a source address and a destination address. The parsing module 110 is connected to the receiving module 100, and is used for parsing the packet to retrieve the source address and the destination address of the packet. The determining module 120 connected to the parsing module 110 and the storage module 130 is for determining whether a source of the packet has been authenticated. In the exemplary embodiment, the determining module 120 compares the source address of the packet with the MAC addresses of the mobile terminal 20 in the notification messages saved in the storage module 130 to determine whether the source of the packet has been authenticated. The sending module 140 is connected to the determining module 120, and sends the packet to a destination corresponding to the destination address if the source of the packet has been authenticated, that is, the packet is from the authenticated mobile terminal 20.

If the source of the packet has not been authenticated, the determining module 120 further determines whether the packet is an HTTP packet. In the exemplary embodiment, packets transmitted by the mobile communication system are HTTP packets. If the packet is not an HTTP packet, the network access device 10 discards the packet.

If the packet is an HTTP packet, the determining module 120 further determines whether a destination of the packet is the authentication server 30. If the destination of the packet is the authentication server 30, the sending module 140 sends the packet to the authentication server 30.

If the destination of the packet is not the authentication server 30, the determining module 120 further determines whether the packet is from the authentication server 30. If the packet is from the authentication server 30, that is, the packet is the first notification message or the second notification message, the storage module 130 saves the packet.

The network access device 10 further includes a redirecting module 1 50 connected to the determining module 120, and the redirecting module 150 is for establishing a connection between the source of the packet and the authentication server 30, for authentication of the source of the packet by the authentication server 30.

In alternative embodiments of the invention, the network access device 10 further includes a downloading module 160 connected to the storage module 130, for downloading data of the authenticated mobile terminal 20 from the authentication server 30 and saving the downloaded data in the storage module 130 when the network access device 10 enters the mobile communication system. Formats and contents of the downloaded data are the same as those of the first notification message and the second notification message.

In the exemplary embodiment, when the network access device 10 receives a first notification message or a second notification message sent by the authentication server 30, the network access device 10 starts to time, and determines whether an idle period of the mobile terminal 20 exceeds the idle timeout period of the first notification message or the second notification message or whether a usage period of the mobile terminal 20 exceeds the aging timeout period of the first notification message or a second notification message. If the idle period of the mobile terminal 20 exceeds the idle timeout period or the usage period of the mobile terminal 20 exceeds the aging timeout period, the network access device 10 deletes the first notification message or the second notification message related to the mobile terminal 20 from the storage module 130. That is, the mobile terminal 20 needs to be re-authenticated by the authentication server 30 to communicate with the network 40 via the network access device 10.

Figure 3:
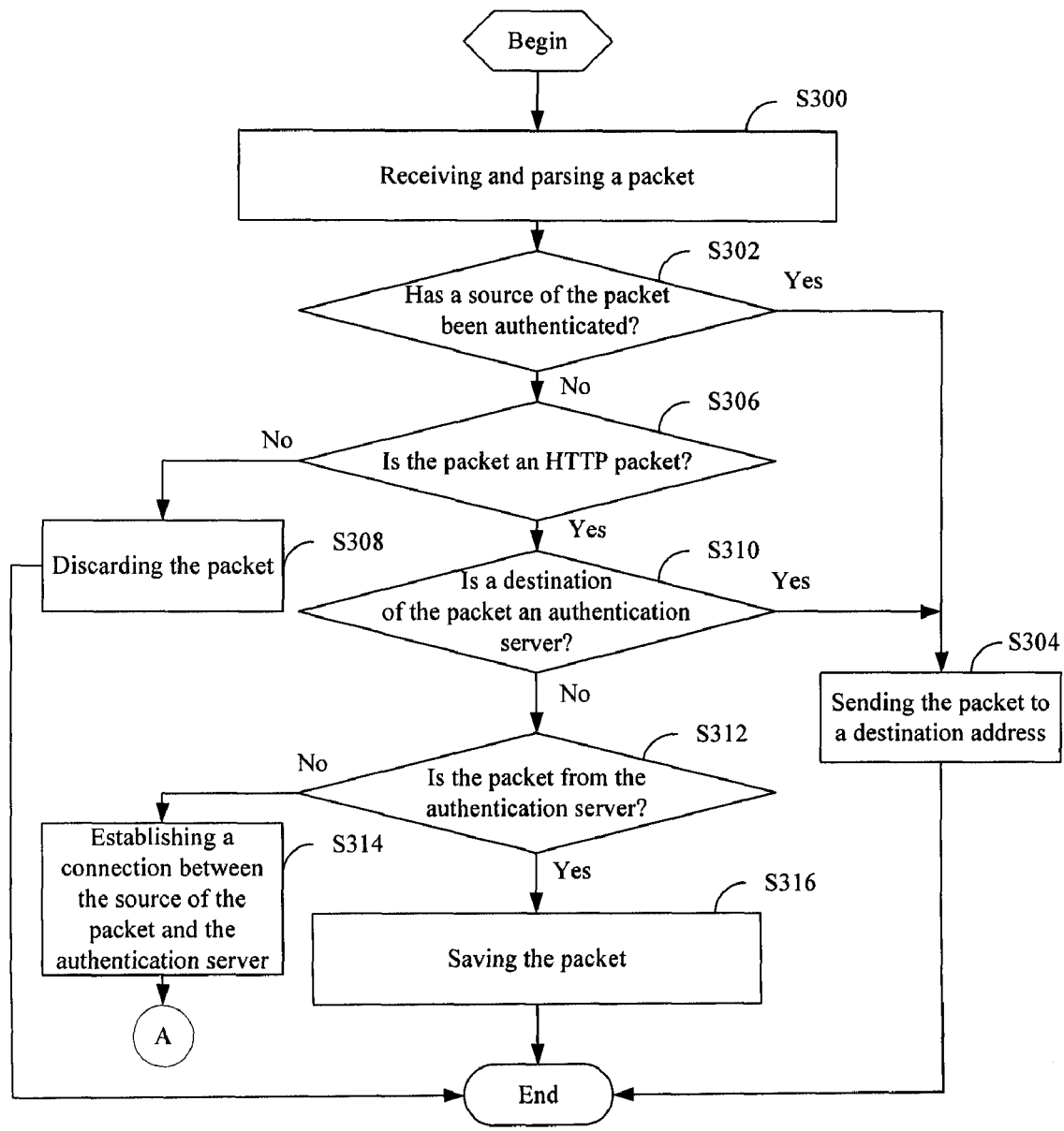
FIG. 3 is a flowchart of packet-processing method of a further exemplary embodiment of the invention.

FIG. 3 is a flowchart of a packet-processing method of the network access device 10 of an exemplary embodiment of the invention. At first, the authentication server 30 and the network access devices 10 have been booted, a manager of the mobile communication system has set data of the network access devices 10 in the authentication server 30, and the network access devices 10 have downloaded data of authenticated mobile terminals 20 from the authentication server 30. The data of authenticated mobile terminal 20 includes MAC addresses of the authenticated mobile terminals 20.

In step S300, the receiving module 100 of one of the network access devices 10 receives a packet, and the parsing module 110 parses the packet to retrieve a source address and a destination address of the packet.

In step S302, the determining module 110 determines whether a source of the packet has been authenticated. In the exemplary embodiment, the determining module 110 compares the source address of the packet with the MAC addresses of the authenticated mobile terminals 20 in the storage module 130 to determine whether the source of the packet has been authenticated. If there is a MAC address of an authenticated mobile terminal 20 same as the source address of the packet, the packet is from an authenticated mobile terminal 20. Otherwise, the source of the packet has not been authenticated.

If the source of the packet has been authenticated, that is, the packet is from an authenticated mobile terminal 20, in step S304, the sending module 140 sends the packet to a destination corresponding to the destination address, that is, the network 40.

If the source of the packet has not been authenticated, in step S306, the determining module 120 determines whether the packet is an HTTP packet. In the exemplary embodiment, packets transmitted in the mobile communication system are HTTP packets.

If the packet is not an HTTP packet, in step S308, the network access device 10 discards the packet. If the packet is an HTTP packet, in step S310, the determining module 120 determines whether a destination of the packet is the authentication sever 30.

If the destination of the packet is the authentication server 30, that is, the packet is an authentication request packet, in step S304, the sending module 140 sends the packet to the destination address. That is, the sending module 140 sends the packet to the authentication server 30.

If the destination of the packet is not the authentication server 30, in step S312, the determining module 120 determines whether the packet is from the authentication server 30.

If the packet is from the authentication server 30, that is, the packet includes a first notification message or a second notification message, in step S316, the storage module 130 saves the packet, that is, the storage module 130 saves the first notification message or the second notification message.

If the packet is not from the authentication server 30, that is, the packet is from an unauthenticated mobile terminal 20, in step S314, the redirecting module 150 establishes a connection between the source of the packet, that is, the unauthenticated mobile terminal 20, and the authentication server 30 for authentication by the authentication server 30.

In an alternative embodiment, determining steps S306 through S310 can be omitted. In another alternative embodiment, steps S306 and S310 can be interchanged.

Figure 4:
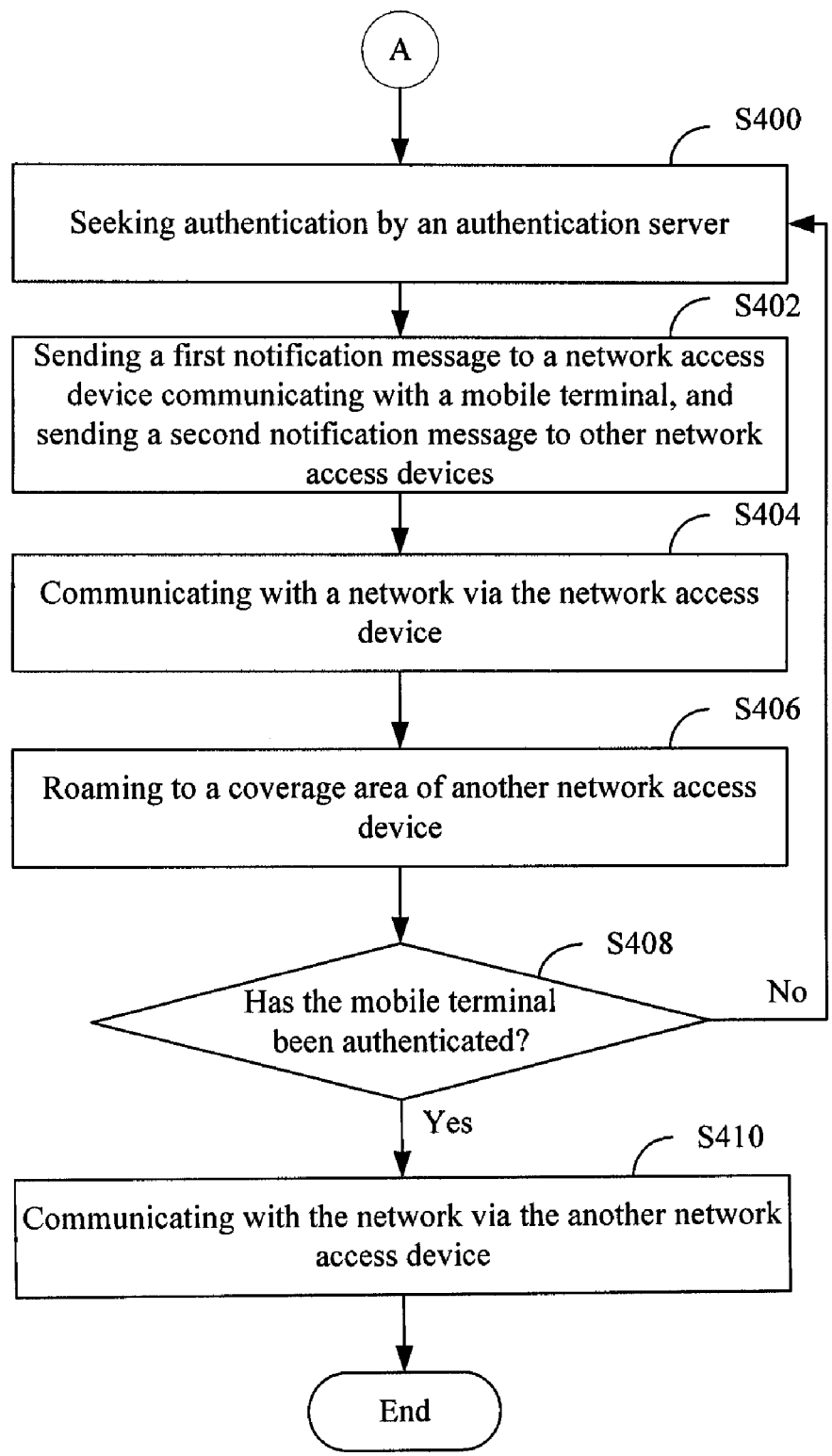
FIG. 4 is a flowchart of a network connection establishing method.

FIG. 4 is flowchart of a network connection establishing method. In step S400, an unauthenticated mobile terminal 20 seeks authentication by the authentication server 30 via one of the network access devices 10. After the redirecting module 1 50 establishes a connection between the unauthenticated mobile terminal 20 and the authentication server 30, the authentication server 30 requests a user name from the unauthenticated mobile terminal 20. The authentication server 30 receives the user name sent by the mobile terminal 20, checks the MAC address of the mobile terminal 20 with the network access device 10, and then requests an access key from the mobile terminal 20. Once an access key is received, authentication of the mobile terminal 20 by the authentication server 30 is finished.

In step S402, after the authentication is finished, the authentication server 30 sends a first notification message to the one of the network access devices 10, and sends a second notification message to other network access devices 10 of the mobile communication system. The network access devices 10 receive notification messages sent by the authentication server 30, process the notification messages according to the packet-processing method of FIG. 3, and save the first notification message or the second notification message in the storage module 130.

In step S404, the mobile terminal 20 communicates with the network 40 via the one of the network access devices 10.

In step S406, the mobile terminal 20 roams to a coverage area of another network access device 10.

In step S408, the another network access device 10 determines whether the mobile terminal 20 has been authenticated. Step S408 includes the determining process of FIG. 3.

If the mobile terminal 20 has been authenticated, in step S410, the mobile terminal 20 communicates with the network 40 via the another network access device 10.

If the mobile terminal 20 has not been authenticated, the redirecting module 1 50 establishes a connection between the mobile terminal 20 and the authentication server 30, and the process returns to step S400.

As long as the mobile terminal 20 is authenticated by the authentication server 30 via one of the network access devices 30, the mobile terminal 20 can communicate with the network 40 via not only the one of the network access devices 30 but also others of the network access devices.

The foregoing disclosure of various embodiments has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto and their equivalents.

What is claimed is:

1. A network access device, for use in a mobile communication system, comprising:
   a receiving module, for receiving a packet, the packet comprising a source address and a destination address;
   a parsing module connected to the receiving module, for parsing the packet to retrieve the source address and the destination address of the packet;
   a storage module for saving notification messages indicating that the source of the packet has been authenticated from an authentication server, wherein each of the notification messages comprises a media access control address of the authenticated source of the packet;
   a determining module for comparing the source address of the packet with the media access control addresses from the notification messages in the storage module to determine whether the source of the packet has been authenticated; and
   a sending module, for sending the packet to a destination corresponding to the destination address of the packet if the source of the packet has been authenticated.

2. The network access device of claim 1, wherein the determining module further determines whether the packet is a hypertext transfer protocol (HTTP) packet if the source of the packet has not been authenticated.

3. The network access device of claim 1, wherein the determining module further determines whether a destination of the packet is the authentication server if the source of the packet has not been authenticated, and the sending module sends the packet to the authentication server when the destination of the packet is the authentication server.

4. The network access device of claim 1, wherein the determining module further determines whether the packet is from the authentication server if the source of the packet has not been authenticated.

5. The network access device of claim 4, further comprising a redirecting module for establishing a connection between the source of the packet and the authentication server, for authentication of the source of the packet by the authentication server.

6. A mobile communication system, for connecting a mobile terminal to a network, comprising:
   the mobile terminal;
   a plurality of network access devices connected to the network, for determining whether the mobile terminal communicating therewith has been authenticated; and
   an authentication server connected to the plurality of network access devices, for authenticating the mobile terminal via one of the plurality of network access devices and sending a first notification message to the one of the plurality of the network access devices and a second notification message to others of the plurality of network access devices after authentication is finished, wherein the second notification message comprises a media access control (MAC) address of the mobile terminal;
   wherein the others of the plurality of network access devices save the second notification messages from the authentication server and compare the MAC addresses in the second notification messages with the MAC address of the mobile terminal to determine whether the mobile terminal has been authenticated and connect the mobile terminal to the network if the mobile terminal has been authenticated.

7. The mobile communication system of claim 6, wherein the first notification message comprises an address of the one of the plurality of network access devices.

8. The mobile communication system of claim 7, wherein each of the plurality of network access devices comprises:
   a storage module, for saving notification messages sent by the authentication server;
   a receiving module, for receiving a packet, the packet comprising a source address and a destination address;
   a parsing module connected to the receiving module, for parsing the packet to retrieve the source address and the destination address of the packet;
   a determining module connected to the storage module and the parsing module, for determining whether a source of the packet has been authenticated; and
   a sending module, for sending the packet to a destination corresponding to the destination address if the source of the packet has been authenticated.

9. The mobile communication system of claim 8, wherein the determining module compares the source address of the packet with the addresses of the notification messages in the storage module to determine whether the source of the packet has been authenticated.

10. The mobile communication system of claim 8, wherein the determining module further determines whether the packet is a hypertext transfer protocol (HTTP) packet if the source of the packet has not been authenticated.

11. The mobile communication system of claim 8, wherein the determining module further determines whether a destination of the packet is the authentication server if the source of the packet has not been authenticated, and the sending module sends the packet to the authentication server if the destination of the packet is the authentication server.

12. The mobile communication system of claim 8, wherein the determining module further determines whether the packet is from the authentication server if the source of the packet has not been authenticated.

13. The mobile communication system of claim 12, wherein each of the plurality of network access devices further comprises a redirecting module for establishing a connection between the source of the packet and the authentication server, for authentication of the source of the packet by the authentication server if the packet is not from the authentication server.

14. A network connection establishing method, for use in a mobile communication system, the mobile communication system comprising a mobile terminal, a plurality of network access devices, and an authentication server, the plurality of network access devices saving notification messages sent by the authentication server, comprising:
   receiving and parsing a packet to retrieve a source address of the packet by one of the plurality of network access devices;
   determining by the one of the plurality of network access devices whether a source of the packet assuming as the mobile terminal has been authenticated;
   determining by the one of the plurality of network access devices whether the packet is from the authentication server if the source of the packet has not been authenticated;
   establishing a connection between the source of the packet and the authentication server by the one of the plurality of network access devices, for authentication of the source of the packet by the authentication server if the packet is not from the authentication server;
   sending a first notification message to the one of the plurality of network access devices and a second notification message to others of the plurality of network access devices by the authentication server after authentication is finished;
   communicating the mobile terminal with the network via the one of the plurality of network access devices;
   allowing the mobile terminal to roam to a coverage area of another of the plurality of the network access devices;
   determining by the another of the plurality of the network access devices whether the mobile terminal has been authenticated; and
   establishing a connection between the mobile terminal and the network by the another of the plurality of the network access devices if the mobile terminal has been authenticated according to the second notification message from the authentication server.

15. The network connection establishing method of claim 14, wherein the first notification message comprises an address of the one of the plurality of network access device, the second notification message comprises a media access control address of the mobile terminal, and the step of determining whether the source of the packet has been authenticated comprises comparing the source address of the packet with the addresses of the notification messages.

16. The network connection establishing method of claim 14, further comprising:
   saving the packet if the packet is from the authentication server.

17. The network connection establishing method of claim 14, further comprising steps of:
  determining whether a destination of the packet is the authentication server if the source of the packet has not been authenticated; and
  sending the packet to the authentication server if the destination of the packet is the authentication server.

18. The network connection establishing method of claim 14, further comprising steps of:
  determining whether the packet is a hypertext transfer protocol (HTTP) packet if the source of the packet has not been authenticated.

* * * * *